Patented Nov. 28, 1933

1,937,417

UNITED STATES PATENT OFFICE 1,937,417

METHOD OF IMPREGNATING CONCRETE BODIES AND POROUS CERAMIC PRODUCTS WITH BITUMINOUS MATERIAL

Edwin C. Wallace, Newton, Mass., assignor to Warren Brothers Company, Cambridge, Mass., a corporation of West Virginia No Drawing. Application August 20, 1930
Serial No. 476,726

8 Claims. (Cl. 91—70)

This invention relates to processes and methods of treating concrete bodies such as piles, pile caps, sewer pipes, conduits, fence posts, etc., to render them more resistant to the action of salt and brackish water, alkaline soil solutions, organic matter, sewer gases, etc.

It is obvious that the process would also apply to clay or ceramic products of similar nature and subjected to the same destructive action.

Various methods have been proposed for treating such bodies, the most practical of which appears to be the application of a protective coating of bituminous material or asphalt to the body to be protected.

To secure effective penetration of the bituminous material into the pores of the body is the chief problem and the object of the present invention is to provide a preliminary treating step which accelerates the penetration, makes it more effective and shortens the process as a whole.

The preliminary treatment consists in the application to the body or article to be impregnated, of a penetrating, mobile, readily diffusive oil, with which bituminous material or asphalt is miscible, such oil preferably consisting of a mixture of cyclic and open chain hydrocarbons of specific gravity ranging from .8 to 1.1 and volatility not exceeding one-third of its volume in five hours at 100° C. with viscosity generally under 200 seconds at 25° C. in the Engler viscosimeter. This oil is absorbed into the pores of the body or article where it serves as a leader for the bituminous coating later applied, causing it to permeate the body to a greater depth than would be the case without the preliminary oil treatment.

Various ways of applying the oil treatment and the subsequent asphalt coating may be employed, but the most practical, so far as now appears, are the open tank treatment and the vacuum tank treatment (as they are referred to herein) and variations of the two.

In the open tank treatment the article to be impregnated, which may or may not be previously dried, is immersed in oil in an open tank and heated to a temperature slightly above the boiling point of water, for example, 220 to 250° F.

The body or article is permitted to remain in the oil bath until it has acquired the temperature of the oil, when the whole is permitted to cool and the article or body removed and drained of the surplus oil.

This draining period may be anywhere from half an hour to a week or longer without impairing the effectiveness of the oil in inducing penetration by the bituminous material when the latter is applied.

After draining, the article or body is immersed in heated asphalt, also in an open tank, the temperature of the asphalt being maintained sufficiently high to permit its penetration into the pores of the body. This temperature will ordinarily range between 250 and 450° F. The heating of the asphalt to this temperature is generally attended with frothing and this step in the treatment is prolonged until frothing ceases.

The temperature is then reduced and the article removed before the asphalt congeals, when the body will be found to have an effective bituminous sheathing fully adherent by reason of the penetration of the bitumen into the pores due to the previously applied oil leader.

In the vacuum tank treatment the article is preferably dried before treatment and, while in this dry condition, is placed in a closed tank from which the air is withdrawn, by a vacuum pump. After a short interval, say ten to twenty minutes, the oil is introduced into the tank without admitting air, so that the body becomes immersed in the oil. After a few minutes of such immersion air is slowly admitted until atmospheric pressure obtains. This pressure is sufficient to effectively inject the oil into the pores of the body.

After this preliminary oil treatment in the closed tank, the article is subjected to treatment with the bituminous material or asphalt in the same or a similar tank and such treatment may follow immediately after the oil treatment or after an interval of several days.

Whether the tank be the same or a different tank, it is emptied, except for the bodies or articles to be treated, and then exhausted of air. Heated asphalt is then introduced and the bodies submerged in the same for a short time. Pressure is then introduced and gradually increased to the desired maximum, which is sometimes as high as 150 lbs. or more per square inch.

With increasing pressure the temperature of the asphalt may be raised as high as may be deemed necessary.

According to the size of the bodies or articles this impregnation period varies from a few hours for small articles easily impregnated, to a day or longer for large articles difficult to impregnate, such as piles, pile caps, etc. The depth of the impregnation varies according to the denseness of the material with which the article or body is formed, and may range anywhere from a fraction of an inch with very dense material, to several inches with more porous material. In every case, however, it must be sufficient to form an effective protective coating on all exposed surfaces of the article, and in hollow articles such as sewer pipe, pile caps, conduits and the like, to form a protective coating on both the inner and outer surfaces.

The preliminary oil treatment increases the adhesion of the bituminous material or asphalt to the treated article, so that it does not readily chip off in handling, and in addition it effects better penetration into the pores and shortens the time required to impregnate.

The method is susceptible of variations of the two plans outlined above, as by applying the oil under the open tank method and the bituminous coating under the vacuum tank method, or vice versa.

When the oil treatment is applied in the vacuum tank, the article to be treated is dried before being placed in the tank and heating of the oil is unnecessary. In fact, the boiling point of the oil is so reduced in a vacuum that excess heat is to be avoided to prevent volatilization.

It has been found in practice that concrete articles will take up from 2% to 5% of oil by weight in the preliminary oil treatment.

In the open tank treatment, the body or article may or may not be dried before introduction into the oil, but in vacuum tank treatment, the article is preferably dried, either by heating in an oven or kiln at a temperature slightly above the boiling point of water, as for example, 220 to 240° F., or by placing in a current of dry air which may be slightly warm.

The invention having been described, what is claimed as new and useful is:—

1. The method for impregnating concrete bodies and porous ceramic products which comprises the initial drying of the article to be treated, then its immersion, in the presence of heat, in a bath of a penetrating, mobile, volatile hydrocarbon oil with which asphalt is miscible, then draining the article of surplus oil, and finally submerging it in asphalt heated to a temperature which will vaporize sufficient oil to facilitate the impregnation of the concrete by the asphalt.

2. The method for impregnating concrete bodies and porous ceramic products which comprises the immersion of the article to be treated in a penetrating, mobile, volatile hydrocarbon oil with which asphalt is miscible, the oil being heated to a temperature slightly above the boiling point of water and the immersion being continued until the article has acquired the temperature of the oil, then removing and draining the article of surplus oil after having allowed it to cool in the oil bath, and finally submerging the article in asphalt heated to a temperature which will vaporize sufficient oil to facilitate the impregnation of the concrete by the asphalt.

3. The method for impregnating concrete bodies and porous ceramic products which comprises the initial drying of the article to be treated, then its immersion in a penetrating, mobile, readily diffusive volatile oil with which asphalt is miscible, the oil being heated to a temperature slightly above the boiling point of water and the immersion being continued until the article has acquired the temperature of the oil, then removing and draining the article of surplus oil after having allowed it to cool in the oil bath, then submerging the article in asphalt heated in an open tank to a temperature within range of 300° F. to 450° F. and prolonging this treatment until any indication of frothing disappears, and then reducing the temperature and removing the article before the asphalt congeals.

4. The method for impregnating concrete bodies and porous ceramic products which comprises first subjecting the article to be treated to a volatile oil bath in a vacuum, then after a short interval admitting air until atmospheric pressure obtains, and finally applying asphalt under pressure heated to a temperature which will vaporize sufficient oil to facilitate the impregnation of the concrete by the asphalt.

5. The method for impregnating concrete bodies and porous ceramic products which comprises first subjecting the article to be treated to a volatile oil bath in a vacuum, then after a short interval admitting air until atmospheric pressure obtains, and finally applying asphalt under pressure heated to a temperature which will vaporize sufficient oil to facilitate the impregnation of the concrete by the asphalt, the pressure being gradually increased and the temperature of the asphalt correspondingly raised.

6. The method of providing concrete bodies and porous, ceramic products with a protective coating which comprises immersing the article in volatile oil in the presence of heat until the oil permeates the pores of the body, then draining off excess oil and immersing the body in asphalt or bituminous material heated to a temperature which will vaporize sufficient oil to facilitate the impregnation of the concrete by the asphalt, and then after allowing the mass to cool removing the treated article prior to congelation of the bituminous material.

7. The method of impregnating concrete bodies and porous ceramic products which comprises placing the articles to be treated, in dried condition, in a closed tank; then exhausting air; then introducing a mobile penetrating hydrocarbon volatile oil to submerge the articles; then later admitting air to a normal pressure and after a short interval withdrawing the oil and again exhausting the air and then introducing asphalt or bitumen of similar nature heated to a temperature which will vaporize sufficient oil to facilitate the impregnation of the concrete by the asphalt; then increasing pressure and temperature and maintaining same for a time; then after allowing the mass to cool removing the treated articles before the bitumen congeals.

8. The method of impregnating concrete bodies and porous ceramic products which comprises the initial drying of the article to be treated, then its immersion, in a bath of a penetrating, mobile, volatile hydrocarbon oil with which asphalt is miscible, then draining the article of surplus oil, and finally submerging it in asphalt heated to a temperature sufficient to vaporize part of the oil to facilitate the impregnation of the body by the viscous bituminous material.

EDWIN C. WALLACE.